(12) United States Patent
Hagiwara et al.

(10) Patent No.: US 11,314,477 B2
(45) Date of Patent: Apr. 26, 2022

(54) AUDIO PROCESSING APPARATUS, OPERATION METHOD OF AUDIO PROCESSING APPARATUS, AND AUDIO PROCESSING SYSTEM

(71) Applicant: Yamaha Corporation, Hamamatsu (JP)

(72) Inventors: Hideki Hagiwara, Hamamatsu (JP); Toru Kitayama, Hamamatsu (JP); Takashi Ito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 92 days.

(21) Appl. No.: 17/009,864

(22) Filed: Sep. 2, 2020

(65) Prior Publication Data

US 2021/0064326 A1 Mar. 4, 2021

(30) Foreign Application Priority Data

Sep. 3, 2019 (JP) .............................. JP2019-160421

(51) Int. Cl.
*G06F 3/16* (2006.01)
*H04R 3/04* (2006.01)

(52) U.S. Cl.
CPC .............. *G06F 3/162* (2013.01); *H04R 3/04* (2013.01)

(58) Field of Classification Search
CPC ............ G06F 3/162; H04R 3/04; H04H 60/04
See application file for complete search history.

(56) References Cited

U.S. PATENT DOCUMENTS

| | | | | |
|---|---|---|---|---|
| 6,218,971 B1* | 4/2001 | Sugihara | ................ | H04H 60/04 341/110 |
| 8,059,839 B2* | 11/2011 | Aiso | ...................... | H04H 60/04 381/119 |
| 8,498,724 B2* | 7/2013 | Aoki | ...................... | H04H 60/04 700/94 |
| 9,678,706 B2* | 6/2017 | Okabayashi | ........... | G06F 3/165 |
| 9,990,956 B2* | 6/2018 | Shimada | ............... | G11B 20/10 |
| 2017/0033879 A1 | 2/2017 | Shimada | | |

FOREIGN PATENT DOCUMENTS

JP 2017-33614 A 2/2017

* cited by examiner

*Primary Examiner* — Joseph Saunders, Jr.
(74) *Attorney, Agent, or Firm* — Crowell & Moring LLP

(57) ABSTRACT

An audio processing apparatus includes a first input port, a second input port, a first processor that processes an audio signal input to the first input port and that includes a first adjuster which adjusts acoustic characteristics of the audio signal, a second processor that processes an audio signal input to the second input port, and output ports having a first particular output port. In a first operation mode, the first adjuster is set in an effective state and each of an audio signal as processed by the first processor and an audio signal as processed by the second processor is output from one or more of the output ports. In a second operation mode, the first adjuster is set in an ineffective state and an audio signal as processed by the first processor is output from the first particular output port.

16 Claims, 6 Drawing Sheets

AUDIO PROCESSING APPARATUS, OPERATION METHOD OF AUDIO PROCESSING APPARATUS, AND AUDIO PROCESSING SYSTEM

CROSS REFERENCE TO RELATED APPLICATIONS

This application is based on Japanese Patent Application (No. 2019-160421) filed on Sep. 3, 2019, the contents of which are incorporated herein by reference.

BACKGROUND OF THE INVENTION

1. Field of the Invention

The present disclosure relates to an audio processing apparatus, an operation method of the audio processing apparatus, and an audio processing system.

2. Description of the Related Art

Audio processing apparatus (what is called audio interfaces) for relaying between an audio apparatus such as a sound pickup apparatus or a sound emitting apparatus and an information processing apparatus for production of a musical piece (DAW: digital audio workstation) have been proposed recently. For example, JP-A-2017-33614 discloses a sound recording system in which plural sound recording apparatus are connected to each other in cascade.

However, in a situation that plural sound recording apparatus are connected to each other, there is a problem that a user needs to set how each sound recording apparatus should operate taking into consideration relationships between various kinds of audio processing to be performed by the respective sound recording apparatus; such setting work is cumbersome.

SUMMARY OF THE INVENTION

The concept of the present disclosure has been conceived in view of the above circumstances, and an object of the disclosure is to connect plural audio processing apparatus in a simple manner.

To attain the above object, an audio processing apparatus according to a first aspect of the disclosure includes a first input port, a second input port, a first processor configured to process an audio signal input to the first input port and that includes a first adjuster configured to adjust acoustic characteristics of the audio signal, a second processor configured to process an audio signal input to the second input port, and plural output ports having a first particular output port, in which in a first operation mode, the first adjuster is set in an effective state and each of an audio signal as processed by the first processor and an audio signal as processed by the second processor is output from selected one or more of the plural output ports, and in a second operation mode, the first adjuster is set in an ineffective state and an audio signal as processed by the first processor is output from the first particular output port.

An audio processing system according to a second aspect of the disclosure includes a first audio processing apparatus and a second audio processing apparatus, in which each of the first audio processing apparatus and the second audio processing apparatus includes: a first input port, a second input port, a first processor which processes an audio signal input to the first input port and includes a first adjuster which adjusts acoustic characteristics of the audio signal, a second processor which processes an audio signal input to the second input port, and plural output ports having a first particular output port, in a first operation mode, the first adjuster is set in an effective state and each of an audio signal as processed by the first processor and an audio signal as processed by the second processor is output from selected one or more of the plural output ports, in a second operation mode, the first adjuster is set in an ineffective state and an audio signal as processed by the first processor is output from the first particular output port, the first particular output port of the first audio processing apparatus is connected to the second input port of the second audio processing apparatus, the first audio processing apparatus is set in the second operation mode, and the second audio processing apparatus is set in the first operation mode.

An operation method of an audio processing apparatus according to a third aspect of the invention is an operation method of an audio processing apparatus, in which the audio processing apparatus includes a first input port, a second input port, a first processor configured to process an audio signal input to the first input port and includes a first adjuster configured to adjust acoustic characteristics of the audio signal, a second processor configured to process an audio signal input to the second input port, and plural output ports including a first particular output port. The operation method includes: in a first operation mode, setting the first adjuster in an effective state and outputting each of an audio signal as processed by the first processor and an audio signal as processed by the second processor from selected one or more of the plural output ports, and in a second operation mode, setting the first adjuster in an ineffective state and outputting an audio signal as processed by the first processor from the first particular output port.

An operation method of an audio processing system according to a fourth aspect of the disclosure is an operation method of an audio processing system including a first audio processing apparatus and a second audio processing apparatus each of which includes a first input port; a second input port; a first processer configured to process an audio signal input to the first input port and that includes a first adjuster configured to adjust acoustic characteristics of the audio signal, a second processer configured to process an audio signal input to the second input port, and plural output ports including a first particular output port, in which the first particular output port of the first audio processing apparatus is connected to the second input port of the second audio processing apparatus, the operation method including: setting the first audio processing apparatus in a second operation mode, setting the second audio processing apparatus in a first operation mode, in the first operation mode, setting the first adjuster in an effective state and outputting each of an audio signal as processed by the first processer and an audio signal as processed by the second processer from selected one or more of the plural output ports, and, in the second operation mode, setting the first adjuster in an ineffective state and outputting an audio signal as processed by the first processer from the first particular output port.

DETAILED DESCRIPTION OF THE EXEMPLARY EMBODIMENTS

A. Embodiment

Figure 1:
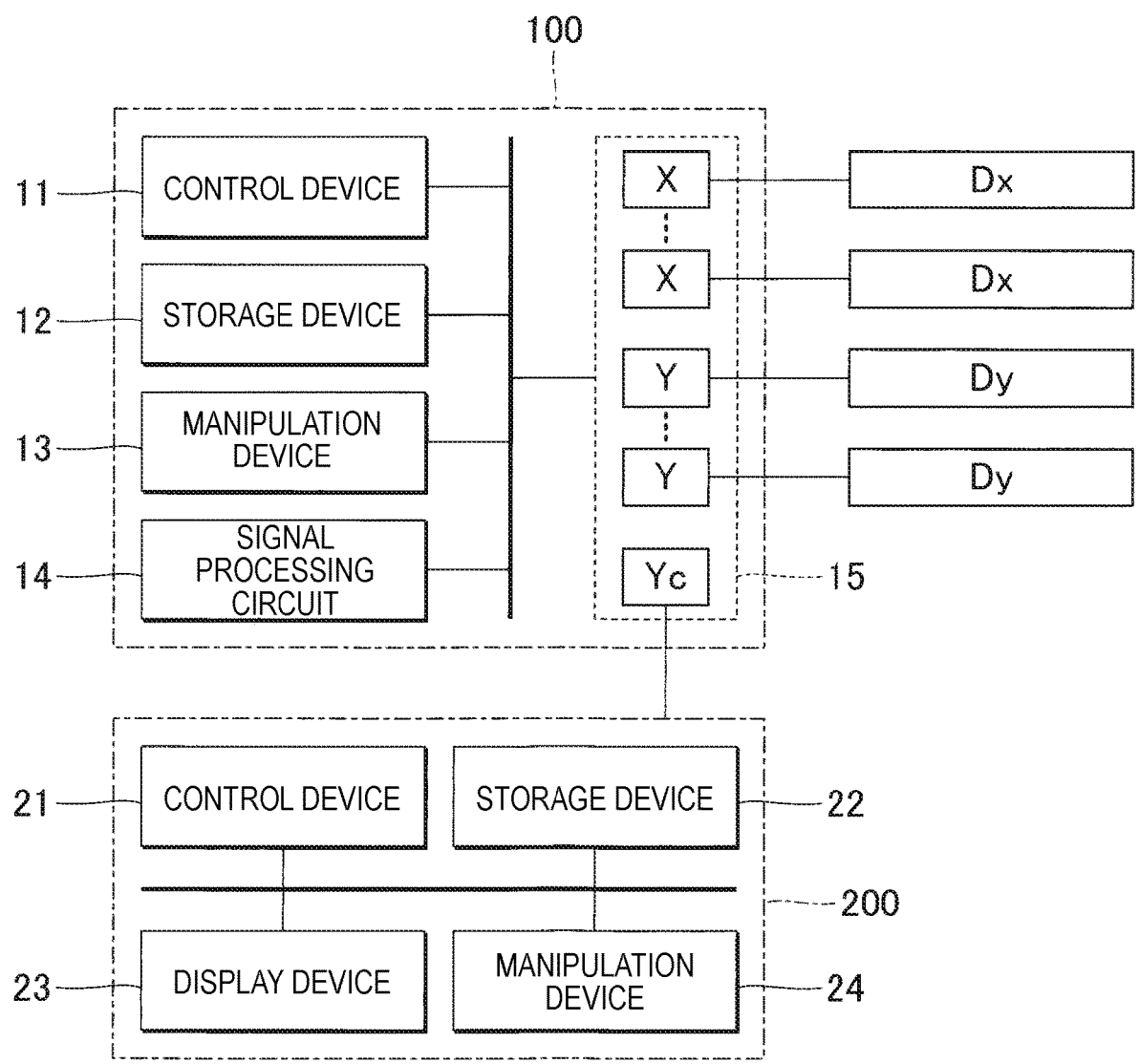
FIG. 1 is a block diagram showing the configuration of an audio processing apparatus according to an embodiment.

FIG. 1 is a block diagram showing the configuration of an audio processing apparatus 100 according to an exemplary embodiment. The audio processing apparatus 100 is a signal processing apparatus to be used for recording and editing of a musical piece. The audio processing apparatus 100 includes a control device 11, a storage device 12, a manipulation device 13, a signal processing circuit 14, and connection ports 15.

The connection ports 15 are plural connection ports (plural input ports X and plural output ports Y) to which external apparatus that are separate from the audio processing apparatus 100 are connected. More specifically, audio apparatus D (Dx and Dy) and an information processing apparatus 200 are connected to the connection ports 15. The audio apparatus D are input apparatus Dx each of which supplies an audio signal to the audio processing apparatus 100 and output apparatus Dy each of which receives an audio signal from the audio processing apparatus 100. For example, each input apparatus Dx is a sound pickup apparatus that generates an audio signal representing a waveform of an acoustic environment or an electric musical instrument, such as an electric guitar, that generates an audio signal according to a play performed by a user. Each output apparatus Dy is a sound emitting apparatus that emits a sound according to an audio signal or a signal processing apparatus (e.g., amplifier or mixer) that amplifies or adjusts an audio signal.

The control device 11 is configured by a single or plural processors that control individual elements of the audio processing apparatus 100. For example, the control device 11 is configured by one or plural kinds of processors such as a CPU (central processing unit), an SPU (sound processing unit), a DSP (digital signal processor), an FPGA (field programmable gate array), and an ASIC (application-specific integrated circuits).

The storage device 12 is a single or plural memories that store programs to be run by the control device 11 and various kinds of data to be used by the control device 11. The storage device 12 is configured using a known recording medium such as a magnetic recording medium or a semiconductor recording medium. The storage device 12 may be configured as a combination of plural kinds of recording media. Alternatively, a portable recording medium that can be attached to and removed from the audio processing apparatus 100 or an external recording medium (e.g., online storage) capable of communicating with the audio processing apparatus 100 may be used as the storage device 12.

The manipulation device 13 is an input device for receiving an instruction from the user. For example, the manipulation device 13 has plural manipulators that can be manipulated by the user. The signal processing circuit 14 is an electric circuit that processes an audio signal. More specifically, the signal processing circuit 14 has many circuit elements for processing an analog or digital audio signal.

The information processing apparatus 200 is a computer system to be used by the user to produce a musical piece such as recording, editing, etc. of a musical piece and functions as a DAW (digital audio workstation). For example, any of various kinds of information terminals such as a personal computer or a tablet terminal is used as the information processing apparatus 200. The audio processing apparatus 100 is used as an audio interface for relaying between the audio apparatus D and the information processing apparatus 200.

The information processing apparatus 200 includes a control device 21, a storage device 22, a display device 23, and a manipulation device 24. The control device 21 is configured by a single processor or plural processors that control individual elements of the information processing apparatus 200. For example, the control device 21 is configured by one or plural kinds of processors such as a CPU, an SPU, a DSP, an FPGA, and an ASIC. The storage device 22 is a single or plural memories that store programs to be run by the control device 21 and various kinds of data to be used by the control device 21. The storage device 22 is configured using a known recording medium such as a magnetic recording medium or a semiconductor recording medium. The storage device 22 may be configured as a combination of plural kinds of recording media.

The display device 23 displays various kinds of pictures under the control of the control device 21. For example, a manipulation picture for production of a musical piece is displayed on the display device 23. The manipulation device 24 receives a manipulation of the user. For example, the manipulation device 24 receives an instruction for recording or editing of a musical piece.

Figure 2:
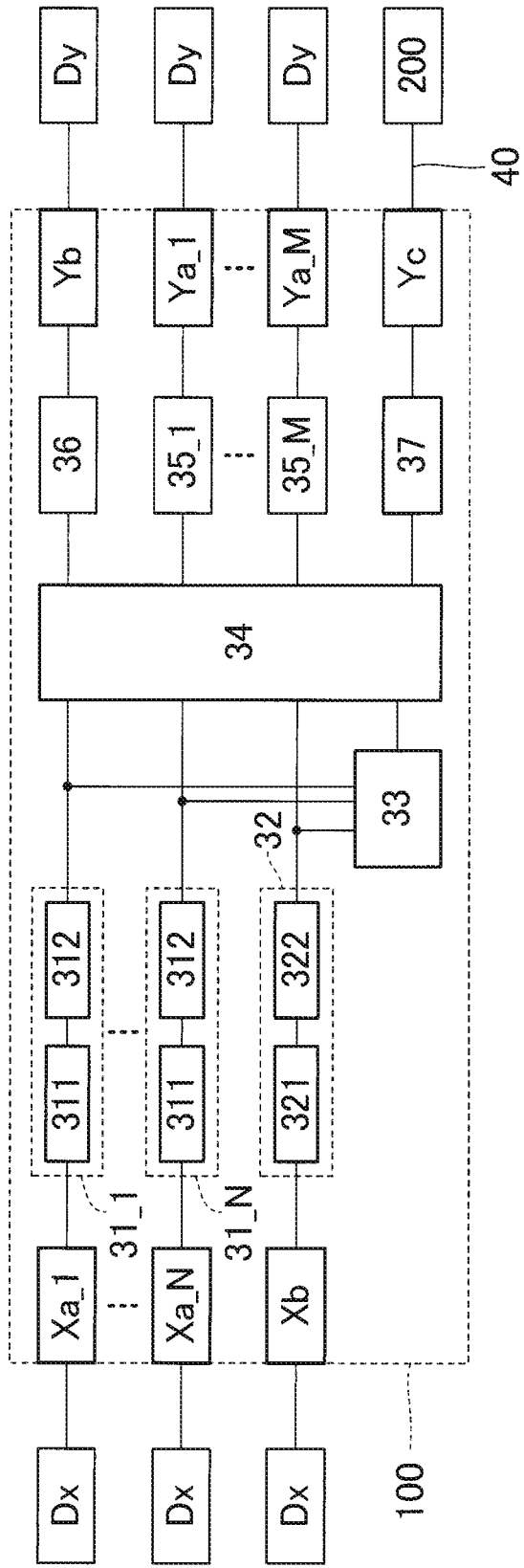
FIG. 2 is a block diagram showing the functional configuration of the audio processing apparatus according to the embodiment.

FIG. 2 is a block diagram showing the functional configuration of the audio processing apparatus 100. The connection ports 15 are plural input ports X (Xa_1 to Xa_N, Xb) and plural output ports Y (Ya_1 to Ya_M, Yb, Yc). Each of the plural input ports X is a connection terminal for input of an audio signal to the audio processing apparatus 100. On the other hand, each of the plural output ports Y is a connection terminal for output of an audio signal from the audio processing apparatus 100.

The plural input ports X includes N input ports Xa_1 to Xa_N (N: a natural number larger than or equal to 2) and one input port Xb. Each of the N input ports Xa_1 to Xa_N is a connection terminal to which an analog audio signal is input. For example, an input apparatus Dx such as a sound pickup apparatus or an electric musical instrument is connected to each of the N input ports Xa_n (n=1 to N). For example, each input port Xa_n is an RCA terminal or a phone terminal. The input port Xb is a connection terminal to which a digital audio signal is input. For example, the input port Xb is an optical digital terminal used for optical communication. Each input port Xa_n is an example of a term "first input port" and the input port Xb is an example of a term "second input port."

The plural output ports Y includes M output ports Ya_1 to Ya_M (M: a natural number larger than or equal to 2), one output port Yb, and one output port Yc. Each of the M output ports Ya_1 to Ya_M is a connection terminal that outputs an analog audio signal. For example, an output apparatus Dy such as a sound emitting apparatus is connected to each of the M output ports Ya_m (m=1 to M). For example, each output port Ya_m is a line terminal or a phone terminal. The output port Yb is a connection terminal that outputs a digital audio signal. For example, the output port Yb is an optical digital terminal used for optical communication. That is, the output port Yb is a connection terminal that is of the same kind as the input port Xb. The output port Yb is an example of a term "first particular output port."

The output port Yc is a connection terminal for communication with the information processing apparatus 200. The output port Yc is a USB (Universal Serial Bus) terminal for exchange of, for example, a digital audio signal with the information processing apparatus 200. That is, the information processing apparatus 200 is connected to the output port Yc of the audio processing apparatus 100 by a connection cable 40 which is a USB cable, for example. In actuality, the output port Yc is an input/output port that functions not only as an output terminal that outputs an audio signal to the information processing apparatus 200 but also as an input terminal that receives an audio signal from the information processing apparatus 200. However, in the following description, from the viewpoint of paying attention to output of an audio signal to the information processing apparatus 200 (i.e., for convenience) a description will be made with the output port Yc regarded as one of the plural output ports Y. The output port Yc is an example of a term "second particular output port."

The audio processing apparatus 100 includes N first processing units (first processors) 31_1 to 31_N, a second processing unit (second processor) 32, a mixing processing unit 33, a selection processing unit 34, M D/A converters 35_1 to 35_M, an output processing unit 36, and a relay processing unit 37.

The N first processing units 31_1 to 31_N correspond to the N respective input ports Xa_1 to Xa_N. The input port Xa_n is connected to the first processing unit 31_n. The first processing unit 31_n corresponding to the input port Xa_n processes an audio signal that is input to the input port Xa_n. The first processing unit 31_n includes a conversion unit 311 and an adjusting unit (first adjuster) 312. The conversion unit 311 is implemented as the signal processing circuit 14. The adjusting unit 312 is realized by the control device 11's running a program. The adjusting unit 312 may be implemented as the signal processing circuit 14.

Figure 3:
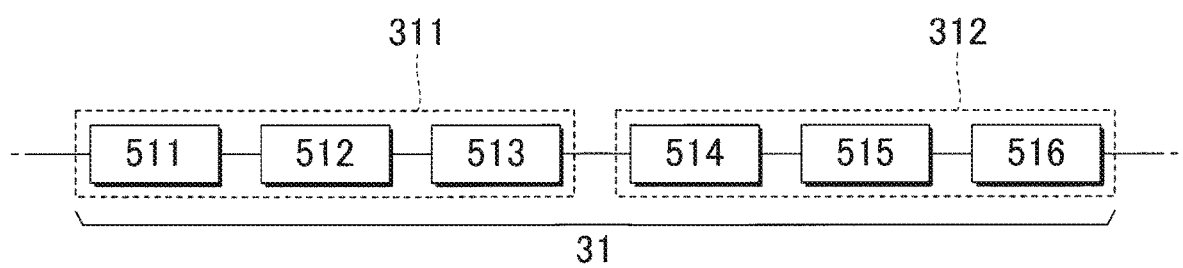
FIG. 3 is a block diagram showing a specific configuration of a first processing unit.

FIG. 3 is a block diagram showing a specific configuration of the first processing unit 31_n. The conversion unit 311 converts an audio signal into a signal that is suitable for processing to be performed by the adjusting unit 312. More specifically, the conversion unit 311 includes an attenuation unit 511 for attenuating an audio signal, an amplification unit 512 for amplifying an audio signal, and an A/D converter 513 for converting an analog audio signal into a digital audio signal. The functions and the order of the elements constituting the conversion unit 311 are changed in a desired manner.

The adjusting unit 312 adjusts the acoustic characteristics of an audio signal as processed by the conversion unit 311. More specifically, the adjusting unit 312 includes a phase inverter 514 for inverting the phase of an audio signal, a highpass filter 515 for emphasizing a high-frequency component of an audio signal, and an effect adding unit 516 for adjusting the frequency characteristic of an audio signal. The effect adding unit 516 has various kinds of effectors such as an equalizer for adjusting the signal level of an audio signal on a band-by-band basis, a distorter for distorting the tone of an audio signal, and a compressor for suppressing the signal level of an audio signal in an interval where the signal level is high. The functions and the order of the elements constituting the adjusting unit 312 are changed in a desired manner. The adjusting unit 312 is an example of a term "first adjusting unit."

The second processing unit 32 shown in FIG. 2 is connected to the input port Xb. The second processing unit 32 processes an audio signal that is input to the input port Xb. More specifically, the second processing unit 32 includes a conversion unit 321 and an adjusting unit (second adjuster) 322. The conversion unit 321 is implemented as the signal processing circuit 14. The adjusting unit 322 is realized by the control device 11's running a program. The adjusting unit 322 may be implemented as the signal processing circuit 14.

Figure 4:
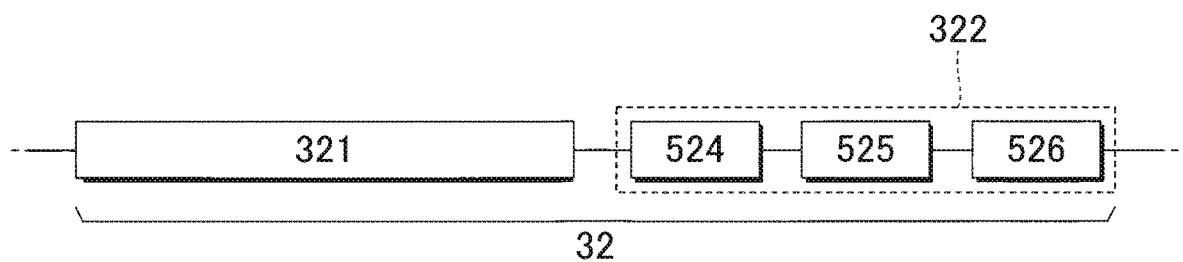
FIG. 4 is a block diagram showing a specific configuration of a second processing unit.

FIG. 4 is a block diagram showing a specific configuration of the second processing unit 32. The conversion unit 321 converts an audio signal into a signal that is suitable for processing to be performed by the adjusting unit 322. More specifically, the conversion unit 321 is a receiving circuit (DIR: digital audio interface receiver) for demodulating an optical digital signal that is input to the input port Xb into digital audio signals corresponding to plural channels.

The adjusting unit 322 adjusts the acoustic characteristics of audio signals as processed by the conversion unit 321. More specifically, like the adjusting unit 312, the adjusting unit 322 includes a phase inverter 524, a highpass filter 525, and an effect adding unit 526. The functions and the order of the elements constituting the adjusting unit 322 are changed in a desired manner. The adjusting unit 322 is an example of a term "second adjusting unit."

The mixing processing unit 33 shown in FIG. 2 is a mixer for combining audio signals of plural channels including audio signals as processed by the respective first processing units 31_n and an audio signal as processed by the second processing unit 32. Mixing ratios of the respective audio signals are set based on an instruction given to the manipulation device 13 by the user. The mixing processing unit 33 is realized by the control device 11's running a program. Alternatively, the mixing processing unit 33 may be implemented as the signal processing circuit 14.

The relay processing unit 37 relays exchange of signals between the information processing apparatus 200 and the audio processing apparatus 100. More specifically, the relay processing unit 37 converts audio signals of plural channels supplied from the selection processing unit 34 into a USB transmission signal and supplies it to the output port Yc and generates audio signals of plural channels from a transmission signal supplied to the output port Yc from the information processing apparatus 200. The relay processing unit 37 is realized by the control device 11's running a program. Alternatively, the relay processing unit 37 may be implemented as the signal processing circuit 14.

Audio signals of plural channels including audio signals as processed by the respective first processing units 31_n, an audio signal as processed by the second processing unit 32, an audio signal produced by combining by the mixing processing unit 33, and an audio signal as processed by the relay processing unit 37 are supplied to the selection processing unit 34. The selection processing unit 34 performs patching on the audio signals of plural channels supplied to it. That is, the selection processing unit 34 is a selector for selecting respective output destinations of the audio signals of plural channels supplied to it. Output destinations of audio signals are selected from the M D/A converters 35_1 to 35_M, the output processing unit 36, and the relay processing unit 37 according to an instruction given to the manipulation device 13 by the user. The selection processing unit 34 is realized by the control device 11's running a program. Alternatively, the selection processing unit 34 may be implemented as the signal processing circuit 14.

The M D/A converters 35_1 to 35_M correspond to the M respective output ports Ya_1 to Ya_M. The D/A converter 35_m is connected to the output port Ya_m. Each D/A converter 35_m converts a digital audio signal supplied from the selection processing unit 34 into an analog audio signal. The analog audio signal produced by the D/A converter 35_m through the conversion is output to the corresponding output apparatus Dy via the output port Ya_m. The output processing unit 36 is connected to the output port Yb. The output processing unit 36 is a transmission circuit (DIT: digital audio interface transmitter) for generating an optical digital signal based on audio signals of plural channels supplied from the selection processing unit 34.

The audio processing apparatus 100 operates in one of operation modes including a first operation mode and a second operation mode. More specifically, the control device 11 sets the operation mode based on an instruction given to the manipulation device 13 by the user. As exemplified below, the first operation mode and the second operation mode are different from each other in the state (effective state/ineffective state) relating to the adjusting unit 312 of each first processing unit 31_n and the adjusting unit 322 of the second processing unit 32.

The first operation mode is an operation mode that is set when the audio processing apparatus 100 is used singly. In the first operation mode, the adjusting unit 312 of each first processing unit 31_n and the adjusting unit 322 of the second processing unit 32 are set in the effective state. The effective state is a state in which the acoustic characteristics of an audio signal are adjusted effectively by the adjusting unit 312.

On the other hand, the second operation mode is an operation mode that is suitable for a case that plural audio processing apparatus 100 are used in a state that they are connected to each other. In the second operation mode, the adjusting unit 312 of each first processing unit 31_n and the adjusting unit 322 of the second processing unit 32 are set in an ineffective state. The ineffective state means a state in which adjustment of an audio signal by the adjusting unit 312 or the adjusting unit 322 is ineffective. For example, an example of the ineffective state is a state in which a flat acoustic characteristic is given to an audio signal, that is, no substantial changes are made of the acoustic characteristics by the processing of adjusting the audio signal though the processing is performed on the audio signal. A state in which adjustment by the adjusting unit 312 or the adjusting unit 322 is omitted corresponds to an ineffective state. For example, a state in which an audio signal as processed by the conversion unit 311 of the first processing unit 31_n is supplied directly to the selection processing unit 34 without being adjusted by the adjusting unit 312 corresponds to an ineffective state of the adjusting unit 312. For another example, a state in which an audio signal as processed by the conversion unit 321 of the second processing unit 32 is supplied directly to the selection processing unit 34 without being adjusted by the adjusting unit 322 corresponds to an ineffective state of the adjusting unit 322. As seen from the above examples, the ineffective state is a state that the adjusting unit 312 or the adjusting unit 322 substantially does not function.

Figure 5:
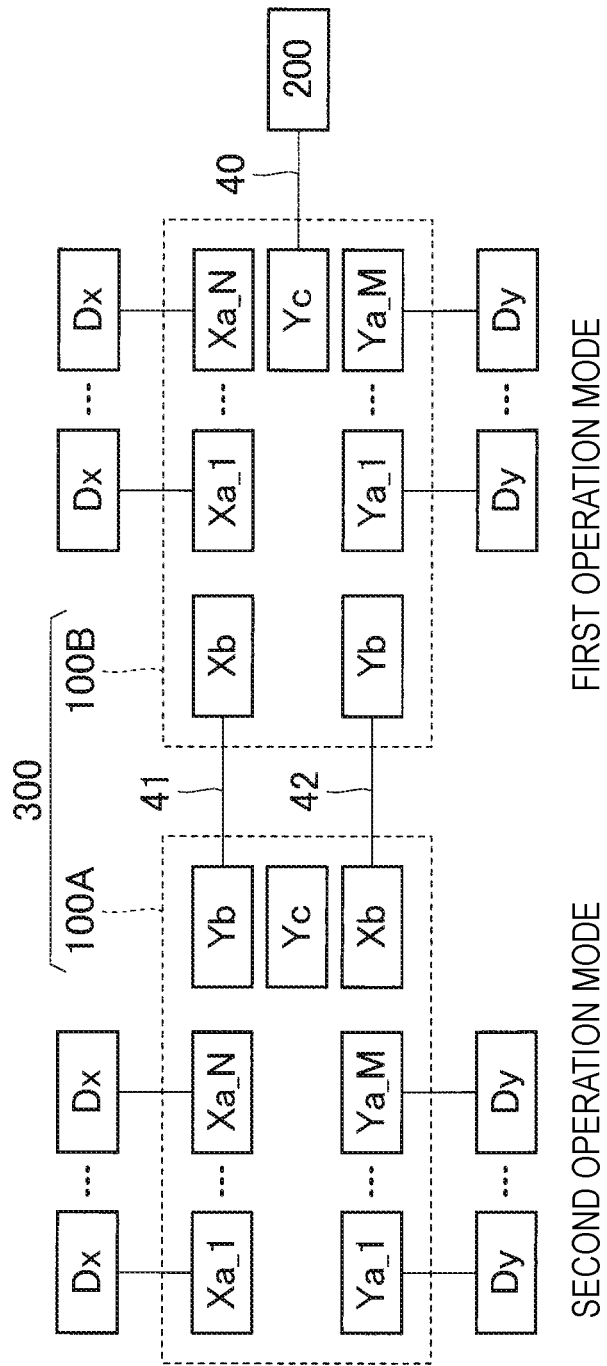
FIG. 5 is a block diagram showing a rough configuration of an audio processing system.

As exemplified in FIG. 5, a user can construct an audio processing system 300 by connecting two audio processing apparatus 100 (audio processing apparatus 100A and audio processing apparatus 100B) to each other. The output port Yb of the audio processing apparatus 100A is connected to the input port Xb of the audio processing apparatus 100B by a connection cable 41 and the output port Yb of the audio processing apparatus 100B is connected to the input port Xb of the audio processing apparatus 100A by a connection cable 42. Each of the connection cables 41 and 42 is an optical cable for optical communication, for example. The audio processing apparatus 100A is an example of a term "first audio processing apparatus" and the audio processing apparatus 100B is an example of a term "second audio processing apparatus."

An input apparatus Dx such as a sound pickup apparatus is connected to each of the N input ports Xa_1 to Xa_N of the audio processing apparatus 100A. That is, audio signals of N channels are input to the audio processing apparatus 100A in parallel. Likewise, an input apparatus Dx is connected to each of the N input ports Xa_1 to Xa_N of the audio processing apparatus 100B. That is, audio signals of N channels are input to the audio processing apparatus 100B in parallel. The audio processing system 300 functions as a system for recording audio signals of 2N channels, that is the N channels of the audio processing apparatus 100A plus the N channels of the audio processing apparatus 100B. That is, whereas in the single audio processing apparatus 100 the total number of input channels is N, in the audio processing system 300 which is constructed by connecting the audio processing apparatus 100A and the audio processing apparatus 100B the total number of input channels is increased to 2N.

An output apparatus Dy such as a sound emitting apparatus is connected to each of the M output ports Ya_1 to Ya_M of the audio processing apparatus 100A. Likewise, an output apparatus Dy is connected to each of the M output ports Ya_1 to Ya_M of the audio processing apparatus 100B. The audio processing system 300 functions as a system for emitting sounds of audio signals of 2M channels, that is, the M channels of the audio processing apparatus 100A plus the M channels of the audio processing apparatus 100B. That is, whereas in the single audio processing apparatus 100 the total number of output channels is M, in the audio processing system 300 which is constructed by connecting the audio processing apparatus 100A and the audio processing apparatus 100B the total number of output channels is increased to 2M.

Figure 6:
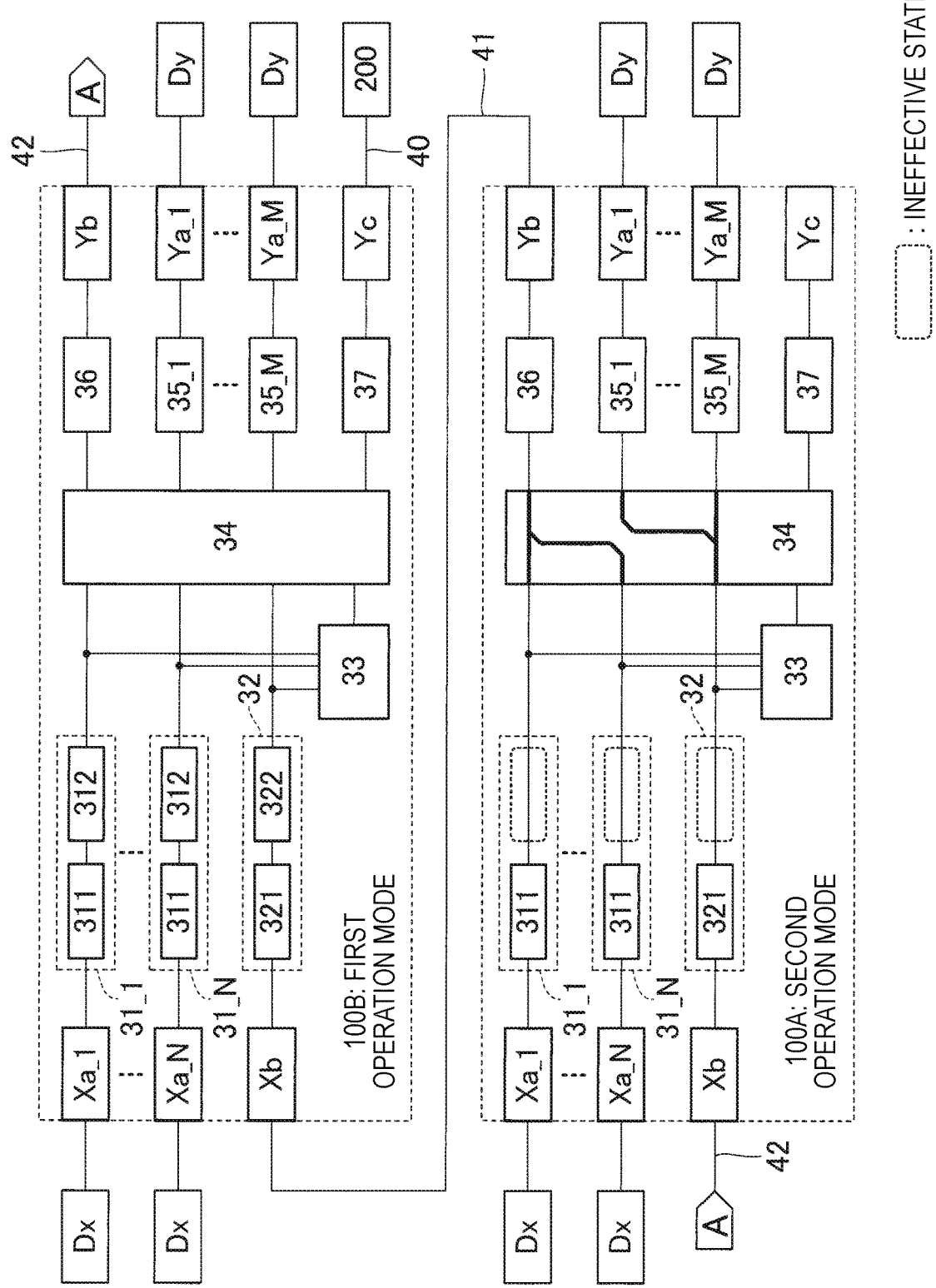
FIG. 6 is a block diagram showing a functional configuration of the audio processing system.

FIG. 6 is a block diagram illustrating how the audio processing apparatus 100A and the audio processing apparatus 100B operate. The operation modes of the audio processing apparatus 100A and the audio processing apparatus 100B are set to the second operation mode and the first operation mode, respectively. In FIG. 6, the adjusting units 312 and 322 being in the ineffective state are indicated by broken lines.

In the audio processing apparatus 100A being set in the second operation mode, the adjusting unit 312 of each first processing unit 31_n and the adjusting unit 322 of the second processing unit 32 are set in the ineffective state. In the second operation mode, the selection processing unit 34 outputs audio signals as processed by the N respective first processing units 31_1 to 31_N to the output port Yb via the output processing unit 36. As is understood from the above description, audio signals of N channels that are input to the audio processing apparatus 100A are converted into an optical digital signal by the output processing unit 36 without being adjusted by the adjusting units 312 and the optical digital signal is output from the output port Yb. The optical digital signal that is output from the output port Yb is input to the input port Xb of the audio processing apparatus 100B via the connection cable 41.

The conversion unit 321 of the second processing unit 32 of the audio processing apparatus 100B generates audio signals of N channels based on the optical digital signal that is input to the input port Xb from the audio processing apparatus 100A. The adjusting unit 322 of the second processing unit 32 adjusts the acoustic characteristics of each of the audio signals of N channels that are input to the input port Xb. On the other hand, input apparatus Dx such as sound pickup apparatus are connected to the N respective input ports Xa_1 to Xa_N of the audio processing apparatus 100B. That is, as in the audio processing apparatus 100A, audio signals of N channels are input to the audio processing apparatus 100B in parallel. As is understood from the above description, audio signals of 2N channels including the audio signals of N channels that are input to the audio processing apparatus 100A and the audio signals of N channels that are input to the audio processing apparatus 100B are supplied to the selection processing unit 34 of the audio processing apparatus 100B.

The selection processing unit 34 of the audio processing apparatus 100B causes the audio signals of 2N channels to be output from one or more output ports Y of the plural output ports Y (Ya_1 to Ya_M, Yb, Yc). More specifically, the selection processing unit 34 outputs audio signals of one or more channels among the 2N channels to one or more output ports Y selected by the manipulation made by the user on the manipulation device 13 among the plural output ports Y.

More specifically, the selection processing unit 34 of the audio processing apparatus 100B can output audio signals of 2N channels to the output port Yc via the relay processing unit 37. The audio signals of the 2N channels are converted by the relay processing unit 37 into a transmission signal which is output from the output port Yc. The transmission signal that is output from the output port Yc is input to the information processing apparatus 200 via the connection cable 40. The control device 21 of the information processing apparatus 200 stores the audio signals of the 2N channels supplied from the audio processing apparatus 100B in the storage device 22. Furthermore, the control device 21 causes the display device 23 to display a manipulation picture for production of a musical piece and adjusts the individual audio signals according to an instruction given to the manipulation device 24 by the user. More specifically, the control device 21 realizes a DAW function such as over-dubbing or mixing on audio signals of plural channels.

The selection processing unit 34 of the audio processing apparatus 100B can output audio signals of two or more channels selected by a manipulation made on the manipulation device 13 among the audio signals of the 2N channels to the output ports Ya_m via D/A converters 35_m, respectively. The audio signals are supplied to output apparatus Dy such as sound emitting apparatus from the output ports Ya_m, respectively. Thus, the user can listen to reproduction sounds of the audio signals that are emitted from the sound emitting apparatus connected to the output ports Ya_m.

The selection processing unit 34 of the audio processing apparatus 100B can output audio signals of two or more channels selected by a manipulation made on the manipulation device 13 among the audio signals of the 2N channels to the output port Yb in the form of an optical digital signal as processed by the output processing unit 36. The optical digital signal that is output to the output port Yb is input to the input port Xb of the audio processing apparatus 100A via the connection cable 42. As described above, in the second operation mode, the adjusting unit 322 of the second processing unit 32 is set in the ineffective state. Thus, the optical digital signal that is input to the input port Xb of the audio processing apparatus 100A is converted by the conversion unit 321 of the second processing unit into audio signals which are supplied to the selection processing unit 34. The audio signals are not adjusted by the adjusting unit 322.

The selection processing unit 34 of the audio processing apparatus 100A outputs the audio signals supplied from the second processing unit 32 to the output ports Ya_m via the D/A converters 35_m, respectively. The audio signals are supplied to output apparatus Dy such as sound emitting apparatus from the output ports Ya_m, respectively. Thus, the user can listen to reproduction sounds of the audio signals that are emitted from the sound emitting apparatus connected to the output ports Ya_m.

Figure 7:
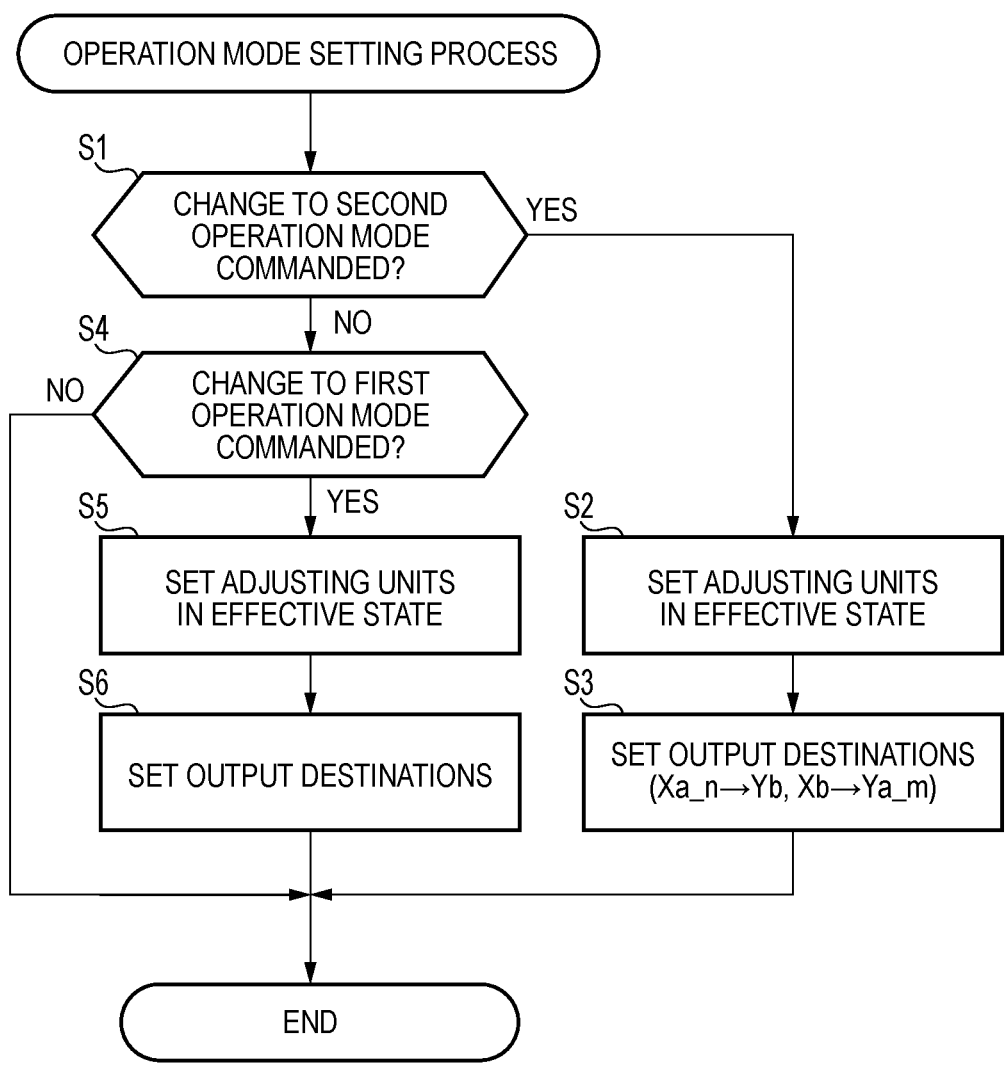
FIG. 7 is a flowchart showing a specific procedure of an operation mode setting process.

FIG. 7 is a flowchart showing a specific procedure of a process (hereinafter referred to as an "operation mode setting process") to be executed by the control device 11 to set an operation mode. The operation mode setting process is executed repeatedly in a prescribed cycle period, for example.

Upon a start of the operation mode setting process, at step S1, the control device 11 judges whether a change from the first operation mode to the second operation mode has been commanded by the user. If a change to the second operation mode has been commanded (S1: yes), at step S2 the control device 11 sets the adjusting units 312 of the first processing units 31_n and the adjusting unit 322 of the second processing unit 32 in the ineffective state. At step S3, the control device 11 sets audio signal output destinations of the selection processing unit 34. More specifically, the control device 11 sets the output destination of audio signals that are input to the input ports Xa_n to the output port Yb and sets the output destinations of an audio signal that is input to the input port Xb to the output ports Ya_m.

On the other hand, if a change to the second operation mode has not been commanded (S1: no), at step S4 the control device 11 judges whether a change from the second operation mode to the first operation mode has been commanded by the user. If a change to the first operation mode has been commanded (S4: yes), at step S5 the control device 11 sets the adjusting units 312 of the first processing units 31_n and the adjusting unit 322 of the second processing unit 32 in the effective state. At step S6, the control device 11 sets audio signal output destinations of the selection processing unit 34 based on an instruction of the user. If a change of the operation mode is not commanded (S4: no), the operation mode setting process is finished.

As described above, the operation mode of the audio processing apparatus 100 is not only set to the first operation mode but also set to the second operation mode. In the second operation mode, the adjusting units 312 and 322 are set in the ineffective mode and audio signals as processed by the first processing units 31_n are output from the output port Yb. Thus, by setting the operation modes of the audio processing apparatus 100A and the audio processing apparatus 100B to the second operation mode and the first operation mode, respectively, the audio processing apparatus 100B can take in audio signals that are input to the input ports Xa_n of the audio processing apparatus 100A and audio signals that are input to the input ports Xa_n of the audio processing apparatus 100B even if the user does not make complicated settings for each audio processing apparatus 100.

Furthermore, since the audio processing apparatus 100A is set in the second operation mode, audio signals that have not been adjusted by the adjusting units 312 are input to the input port Xb of the audio processing apparatus 100B from the output port Yb of the audio processing apparatus 100A. Since the audio processing apparatus 100B is set in the first operation mode, the audio signals that are input to the input port Xb are adjusted by the adjusting unit 322. That is, double adjustment by the adjusting units 312 of the audio processing apparatus 100A and the adjusting unit 322 of the audio processing apparatus 100B can be avoided automatically.

In the embodiment, audio signals as processed by the first processing units 31_n and an audio signal as processed by the second processing unit 32 are output from the output port Yc of the audio processing apparatus 100B which is set in the first operation mode to the information processing apparatus 200 for production of a musical piece. Thus, the information processing apparatus 200 can take in audio signals that are input to the input ports Xa_n of the audio processing apparatus 100A and audio signals that are input to the input ports Xa_n of the audio processing apparatus 100B.

In the embodiment, since in the first operation mode the adjusting unit 322 of the second processing unit 32 is set in the effective state, double adjustment by the adjusting units 312 of the audio processing apparatus 100A and the adjusting unit 322 of the audio processing apparatus 100B can be avoided automatically.

B. Modifications

Specific modifications to the above-described embodiment will be described below. Two or more modes selected in a desired manner may be combined together as appropriate as long as no contradictions occur.

(1) Although in the above-described embodiment the plural input ports Xa_n are provided, only one input port Xa_n may be provided (N=1). However, the above embodiment in which the plural input ports Xa_n are provided provides a remarkable advantage that the total number of input channels is increased substantially. Furthermore, although the plural output ports Ya_m are provided in the above embodiment, the total number of output ports Ya_m may be one (M=1). However, the above embodiment in which the plural output ports Ya_m are provided provides a remarkable advantage that the total number of output channels is increased substantially.

(2) Although in the above-described embodiment each of the input port Xb and the output port Yb is an optical digital terminal, the type of the input port Xb and the output port Yb is not limited to this. For example, a coaxial digital terminal may be used as each of the input port Xb and the output port Yb. As a further alternative, an analog terminal such as an RCA terminal may be used as each of the input port Xb and the output port Yb.

(3) The configuration of each first processing unit 31_n is not limited to the example shown in FIG. 3. For example, the attenuation unit 511 or the amplification unit 512 of the conversion unit 311 may be omitted. An element other than the elements shown in FIG. 3 may be added to the conversion unit 311. Part of the elements of the adjusting unit 312 may be omitted, and an element other than the elements shown in FIG. 3 may be added to the adjusting unit 312. Furthermore, the configuration of the second processing unit 32 is not limited to the example shown in FIG. 4. For example, part the elements of the adjusting unit 322 may be omitted, and an element other than the elements shown in FIG. 4 may be added to the adjusting unit 322.

(4) Although in the above-described embodiment the operation mode is changed according to an instruction given to the manipulation device 13 by the user, how to change the operation mode is not limited to this. For example, the operation mode of the audio processing apparatus 100A may be changed to the second operation mode automatically when the output port Yb of the audio processing apparatus 100A is connected to the input port Ya of the audio processing apparatus 100B. On the other hand, the operation mode of the audio processing apparatus 100A is set to the first operation mode in a state that the output port Yb of the audio processing apparatus 100A is not connected to the input port Ya of the audio processing apparatus 100B.

C: Additional Remarks

For example, the following apparatus and system are provided based on the above-described embodiment:

An audio processing apparatus according to a first aspect (first mode) of the disclosure comprises a first input port; a second input port; a first processing unit which processes an audio signal that is input to the first input port and includes a first adjusting unit which adjusts acoustic characteristics of the audio signal; a second processing unit which processes an audio signal that is input to the second input port; and plural output ports including a first particular output port, wherein in a first operation mode, the first adjusting unit is set in an effective state and each of an audio signal as processed by the first processing unit and an audio signal as processed by the second processing unit is output from selected one or more of the plural output ports; and in a second operation mode, the first adjusting unit is set in an ineffective state and an audio signal as processed by the first processing unit is output from the first particular output port.

In this audio processing apparatus, the operation mode of the audio processing apparatus is set to the first operation mode or the second operation mode. In the second operation mode, the first adjusting unit is set in an ineffective state and an audio signal as processed by the first processing unit is output from the first particular output port. Thus, when a first audio processing apparatus is set in the second operation mode and a second audio processing apparatus is set in the first operation mode, the second audio processing apparatus can take in an audio signal that is input to the first input port of the first audio processing apparatus and an audio signal that is input to the first input port of the second audio processing apparatus even if a user does not make complicated setting for each audio processing apparatus. Furthermore, since the first audio processing apparatus is set in the second operation mode, an audio signal that has not been adjusted by the first adjusting unit is input to the second input port of the second audio processing apparatus from the first particular output port of the first audio processing apparatus. Since the second audio processing apparatus is set in the first operation mode, the audio signal that is input to the second input port is adjusted by the first adjusting unit. Thus, double adjustment by the first adjusting unit of the first audio processing apparatus and the first adjusting unit of the second audio processing apparatus can be avoided automatically.

The "effective state" means a state that adjustment of an audio signal by the first adjusting unit is effective. On the other hand, the "ineffective state" means a state that adjustment of an audio signal by the first adjusting unit is not effective. The "ineffective state" includes a state that the first adjusting unit gives a flat acoustic characteristic to an audio signal or a state that adjustment by the first adjusting unit is omitted.

In a specific example (second mode) of the first mode, the plural output ports include a second particular output port that outputs an audio signal to an information processing apparatus which is used for production of a musical piece; and in the first operation mode, the audio signal as processed by the first processing unit and the audio signal as processed by the second processing unit are output from second particular output port. In this audio processing apparatus, an audio signal as processed by the first processing unit and an audio signal as processed by the second processing unit are output from second particular output port are output to the information processing apparatus which is used for production of a musical piece from the second particular output port of a second audio processing apparatus that is set in the first operation mode. Thus, the information processing apparatus can take in an audio signal that is input to the first input port of a first audio processing apparatus and an audio signal that is input to the first input port of a second audio processing apparatus.

In a specific example (third mode) of the first or second mode, the second processing unit includes a second adjusting unit which adjusts acoustic characteristics of an audios signal that is input to the second input port; and the second adjusting unit is set in an effective state in the first operation mode and set in an ineffective state in the second operation mode. In this audio processing apparatus, the second adjusting unit is set in an effective state in the first operation mode and set in an ineffective state in the second operation mode. Thus, double adjustment by the first adjusting unit of a first audio processing apparatus and the second adjusting unit of a second audio processing apparatus can be avoided automatically.

In a specific example (fourth mode) of any of the first to third modes, the audio processing apparatus comprises plural first input ports including the first input port and plural first processing units including the first processing unit; and in the second processing mode, audio signals as processed by the plural first processing units are output from the first particular output port. In this audio processing apparatus, in the second operation mode, audio signals that are input to the plural respective first input ports are output from the first particular output port. Thus, in a configuration using a first audio processing apparatus and a second audio processing apparatus, a remarkable advantage that the total number of input channels can be increased substantially is obtained.

In a specific example (fifth mode) of any of the first to fourth modes, the first particular output port is an output port that is of the same kind as the second input port. The expression "the first particular output port is of the same kind as the second input port" means that the first particular output port and the second input port employ a common transmission type. For example, both of them are a port for optical transmission.

An audio processing system according to a second aspect (sixth mode) of the disclosure comprises a first audio processing apparatus and a second audio processing apparatus each of which comprises a first input port; a second input port; a first processing unit which processes an audio signal that is input to the first input port and includes a first adjusting unit which adjusts acoustic characteristics of the audio signal; a second processing unit which processes an audio signal that is input to the second input port; and plural output ports including a first particular output port, wherein in a first operation mode, the first adjusting unit is set in an effective state and each of an audio signal as processed by the first processing unit and an audio signal as processed by the second processing unit is output from selected one or more of the plural output ports; and in a second operation mode, the first adjusting unit is set in an ineffective state and an audio signal as processed by the first processing unit is output from the first particular output port; the first particular output port of the first audio processing apparatus is connected to the second input port of the second audio processing apparatus; the first audio processing apparatus is set in the second operation mode; and the second audio processing apparatus is set in the first operation mode.

What is claimed is:

1. An audio processing apparatus comprising:
   a first input port;
   a second input port;
   a first processor configured to process an audio signal input to the first input port and that includes a first adjuster configured to adjust acoustic characteristics of the audio signal;
   a second processor configured to process an audio signal input to the second input port; and
   plural output ports having a first particular output port, wherein:
   in a first operation mode, the first adjuster is set in an effective state and each of an audio signal as processed by the first processor and an audio signal as processed by the second processor is output from selected one or more of the plural output ports; and
   in a second operation mode, the first adjuster is set in an ineffective state and an audio signal as processed by the first processor is output from the first particular output port.

2. The audio processing apparatus according to claim 1, wherein:
   the plural output ports has a second particular output port that outputs an audio signal to an information processing apparatus which is used for production of a musical piece; and
   in the first operation mode, the audio signal as processed by the first processor and the audio signal as processed by the second processor are output from the second particular output port.

3. The audio processing apparatus according to claim 1, wherein:
   the second processor comprises a second adjuster configured to adjust acoustic characteristics of an audio signal input to the second input port; and
   the second adjuster is set in an effective state in the first operation mode and is set in an ineffective state in the second operation mode.

4. The audio processing apparatus according to claim 1, further comprising:
   plural first input ports including the first input port; and
   plural first processors including the first processor, wherein:
   in the second processing mode, the first adjuster of each of the plural first processors is set in the ineffective state and audio signals as processed by the plural first processors are output from the first particular output port.

5. The audio processing apparatus according to claim 1, wherein:
   the first particular output port is an output port that is of the same kind as the second input port.

6. An audio processing system comprising:
   a first audio processing apparatus; and
   a second audio processing apparatus, wherein:
   each of the first audio processing apparatus and the second audio processing apparatus comprises:

a first input port;

a second input port;

a first processor configured to process an audio signal input to the first input port and that includes a first adjuster which adjusts acoustic characteristics of the audio signal;

a second processor configured to process an audio signal input to the second input port; and plural output ports having a first particular output port;

in a first operation mode, the first adjuster is set in an effective state and each of an audio signal as processed by the first processor and an audio signal as processed by the second processor is output from selected one or more of the plural output ports;

in a second operation mode, the first adjuster is set in an ineffective state and an audio signal as processed by the first processor is output from the first particular output port;

the first particular output port of the first audio processing apparatus is connected to the second input port of the second audio processing apparatus;

the first audio processing apparatus is set in the second operation mode; and the second audio processing apparatus is set in the first operation mode.

7. The audio processing system according to claim 6, wherein the first particular output port of the second audio processing apparatus is connected to the second input port of the first audio processing apparatus.

8. The audio processing system according to claim 6, wherein:

in each of the first audio processing apparatus and the second audio processing apparatus, the plural output ports has a second particular output port that outputs an audio signal to an information processing apparatus which is used for production of a musical piece; and in the first operation mode, the audio signal as processed by the first processor and the audio signal as processed by the second processor are output from the second particular output port in the second audio processing apparatus.

9. The audio processing system according to claim 6, wherein:

in each of the first audio processing apparatus and the second audio processing apparatus, the second processor comprises a second adjuster which adjusts acoustic characteristics of an audio signal input to the second input port; and the second adjuster of the second audio processing apparatus is set in an effective state in the first operation mode and the second adjuster of the first audio processing apparatus is set in an ineffective state in the second operation mode.

10. The audio processing system according to claim 6, wherein:

the first audio processing apparatus comprises:

plural first input ports including the first input port; and plural first processors including the first processor;

in the second processing mode, the first adjuster of each of the plural first processors of the first audio processing apparatus is set in the ineffective state and audio signals as processed by the plural first processors are output from the first particular output port of the first audio processing apparatus.

11. The audio processing system according to claim 6, wherein the first particular output port of the first audio processing apparatus is an output port that is of the same kind as the second input port of the second audio processing apparatus.

12. An operation method of an audio processing apparatus, wherein:

the audio processing apparatus comprises:

a first input port;

a second input port;

a first processor configured to process an audio signal input to the first input port and includes a first adjuster configured to adjust acoustic characteristics of the audio signal;

a second processor configured to process an audio signal input to the second input port; and plural output ports including a first particular output port, the operation method comprising:

in a first operation mode, setting the first adjuster in an effective state and outputting each of an audio signal as processed by the first processor and an audio signal as processed by the second processor from selected one or more of the plural output ports; and in a second operation mode, setting the first adjuster in an ineffective state and outputting an audio signal as processed by the first processor from the first particular output port.

13. The operation method according to claim 12, wherein:

the plural output ports has a second particular output port that outputs an audio signal to an information processing apparatus which is used for production of a musical piece; and in the first operation mode, the operation method outputs the audio signal as processed by the first processor and the audio signal as processed by the second processor from the second particular output port.

14. The operation method according to claim 12, wherein:

the second processor includes a second adjuster configured to adjust acoustic characteristics of an audios signal input to the second input port, the operation method comprising:

setting the second adjuster in an effective state in the first operation mode; and setting the second adjuster in an ineffective state in the second operation mode.

15. The operation method according to claim 12, wherein:

the audio processing apparatus comprises plural first input ports including the first input port and plural first processors including the first processor, the operation method comprising:

in the second processing mode, outputting audio signals as processed by the plural first processors from the first particular output port.

16. The operation method of an audio processing apparatus according to claim 12, wherein:

the first particular output port is an output port that is of the same kind as the second input port.

* * * * *